United States Patent [19]

Horiuchi et al.

[11] Patent Number: 4,491,904
[45] Date of Patent: Jan. 1, 1985

[54] CHOPPER CONTROL APPARATUS

[75] Inventors: Michimasa Horiuchi; Hiroshi Sato, both of Katsuta, Japan

[73] Assignee: Hitachi, Ltd., Tokyo, Japan

[21] Appl. No.: 384,519

[22] Filed: Jun. 3, 1982

[30] Foreign Application Priority Data

Jun. 5, 1981 [JP] Japan .................................. 56-85759

[51] Int. Cl.³ .............................................. H02P 5/06
[52] U.S. Cl. ................................... 364/130; 364/184; 364/400; 318/338; 318/345 C; 318/345 G; 318/341
[58] Field of Search ............... 318/338, 345 C, 345 G, 318/341; 364/130, 167, 174, 184, 400, 186

[56] References Cited

U.S. PATENT DOCUMENTS

| | | | |
|---|---|---|---|
| 4,025,836 | 5/1977 | Naito et al. | 318/490 |
| 4,209,733 | 6/1980 | Narita et al. | 318/345 C |
| 4,282,465 | 8/1981 | Acker et al. | 318/341 X |
| 4,284,934 | 8/1981 | Narita et al. | 318/345 C |
| 4,381,479 | 4/1983 | Wesling et al. | 318/341 X |

Primary Examiner—Jerry Smith
Assistant Examiner—Allen MacDonald
Attorney, Agent, or Firm—Antonelli, Terry & Wands

[57] ABSTRACT

A chopper control apparatus comprises a chopper connected between a d.c. power supply source and a load, and a computer for performing an arithmetic operation for controlling the duty factor of the chopper. The computer responds to a clock signal supplied thereto at a predetermined period and arithmetically determines a desired duty factor of the chopper for every period. A turn-on signal generated in synchronism with the clock signal and a turn-off signal generated with a delay of period of time based on the results of the arithmetic operation are sequentially supplied to the chopper. The conducting state of the chopper is detected and the result of the detection is fetched by the computer with a predetermined time delay. The computer executes a program for determining presence or absence of a commutation failure on the basis of the result of the conducting state detection in response to the clock signal serving as an interrupt request signal.

4 Claims, 7 Drawing Figures

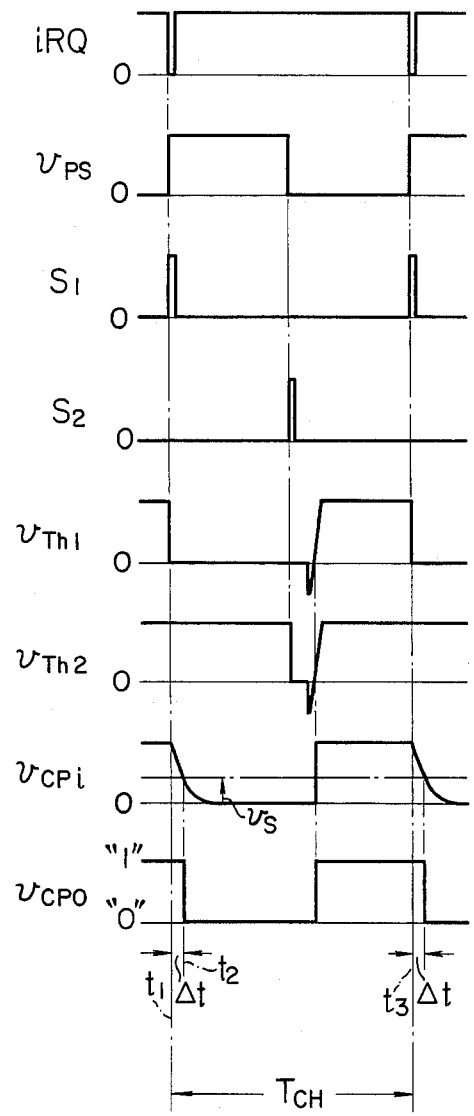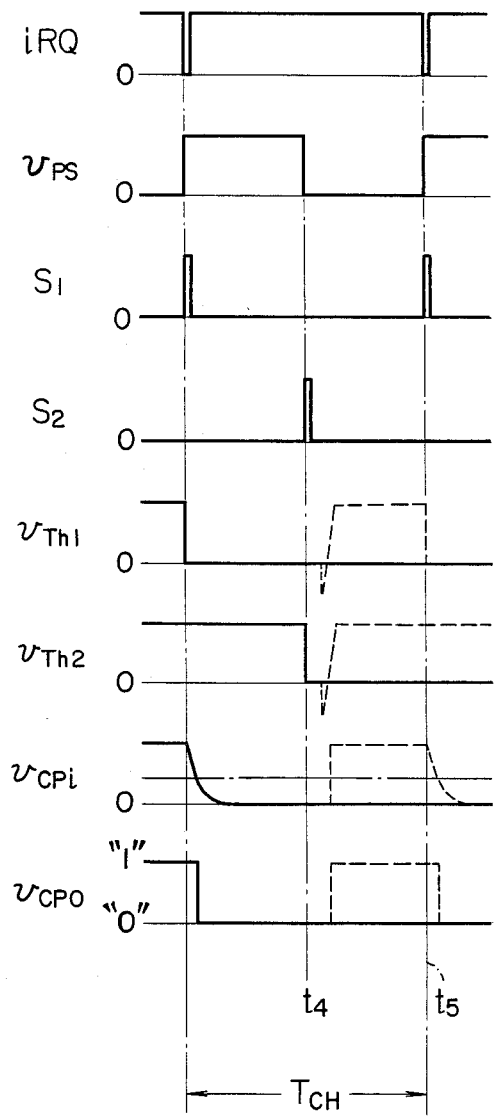

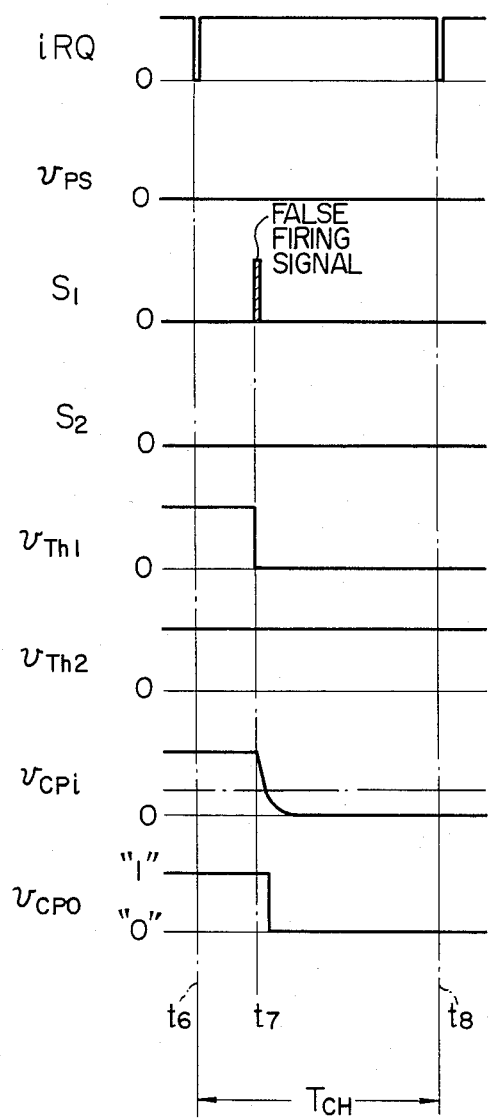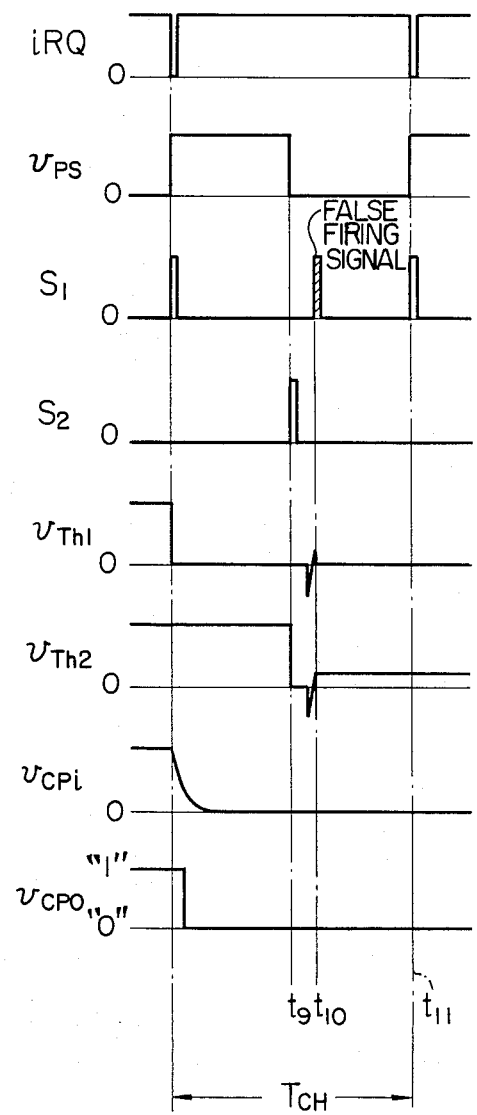

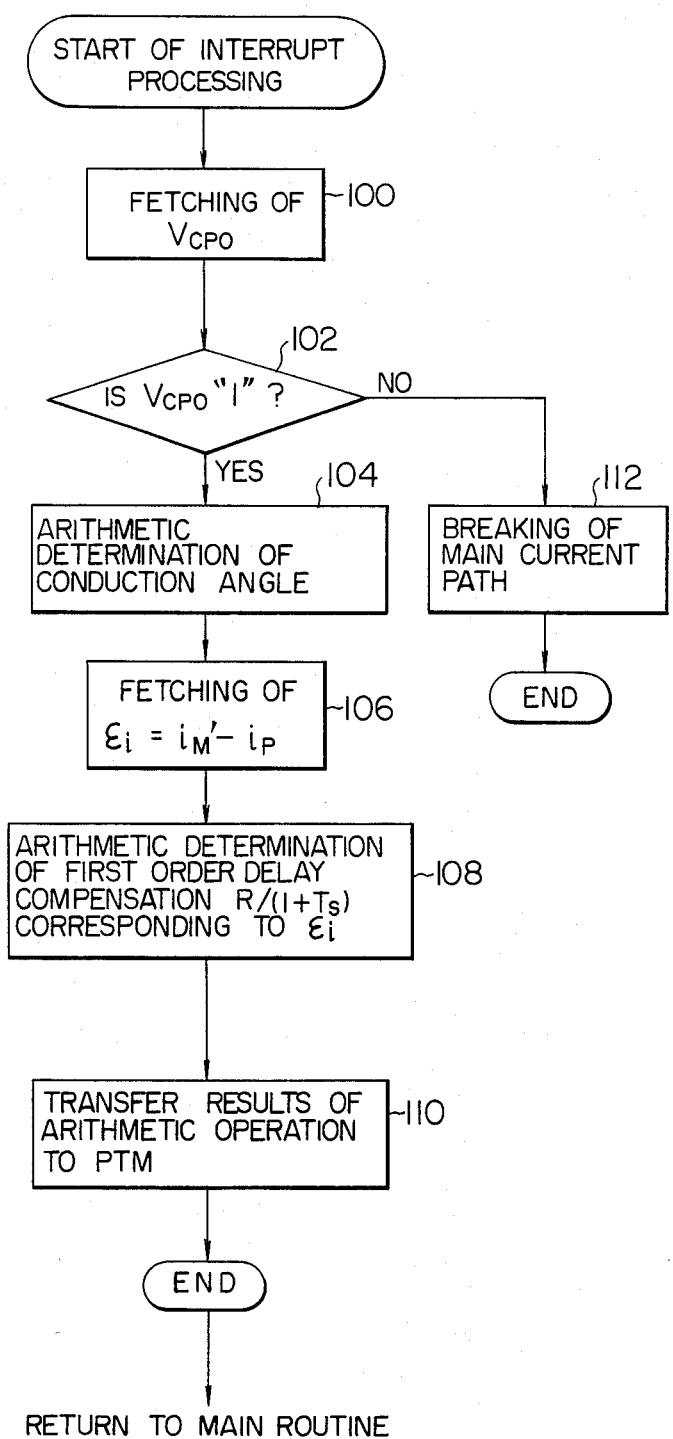

CHOPPER CONTROL APPARATUS

BACKGROUND OF THE INVENTION

1. Field of the Invention

The present invention generally relates to a control apparatus for a chopper circuit. In particular, the invention concerns a chopper control apparatus which is capable of detecting commutation failure occurring in operation of the chopper with the aid of a digital computer such as a micro-computer capable of performing arithmetic operations.

2. Description of the Prior Art

In a chopper control apparatus for a d.c. motor, it is generally conceivable as a control method employing a micro-computer that an interrupt signal is generated for every operation period of the chopper to thereby allow information such as motor current, command values and the like to be fetched by the micro-computer for arithmetically determining a required conduction period or duty factor of the chopper operation for the succeeding period during the current or instant period of the chopper operation.

In this connection, in the case of a chopper control apparatus for use in a battery-powered fork lift truck, for example, it is required that the chopper control apparatus be implemented to be inexpensive in cost to be small in size so as to occupy less space for installation. Further, provision of plural micro-computers is not preferred for practical applications from the economical standpoint. To meet these requirements, it is necessary to use a single micro-computer effectively and efficiently so that it can satisfactorily process a number of various functions such as, for example, control for short-circuiting the chopper by means of a switch in a range where a longer conduction period of the chopper is required, limitation control of duty factor of the chopper for preventing the speed of a fork lift truck from exceeding a predetermined value when the fork carrying a load thereon has been moved up, demand of the operater for alterating the duty factor limitation and others. Under the circumstances, it is required that detection of failures and in particular detection of the commutation failure of the chopper be dealt with through software-based processing while the time required for the arithmetic operation being reduced to a possible minimum. For the detection of the commutation failure of the chopper under the control of the micro-computer, it is generally conceivable that detection of the commutation failure itself is realized on the hardware base, while various processings as required are carried out on the software base by producing an interrupt request signal allotted with a high priority upon detection of the commutation failure. However, this scheme will require not only a complicated configuration of hardware but also additional provision of a circuit for generating the interrupt request signal of the higher priority.

As another method of detecting the commutation failure of the chopper circuit, the terminal voltage (or current) of the chopper is fetched into the micro-computer after the lapse of the commutation period in succession to the generation of the turn-off signal of the chopper, to thereby determine the occurrence of the commutation failure on the basis of the presence or absence of the terminal voltage (or the magnitude of the chopper current). A commutation failure detecting method based on this principle is disclosed, for example, in Japanese patent publication No. 4187/1982 (Laid-open No. 106420/1978). However, this system requires delay means for detecting the elapse of commutation period and means for newly producing the interrupt request signal of higher priority in response to the output signal from the delay means.

By the way, the chopper control apparatus must be, as a matter of fact, so constructed that probability of occurrence of the commutation failure is extremely low, so far as the turn-off signal is normally produced. Accordingly, the commutation failure may occur only when the turn-off signal is not produced normally for some cause such as failure in the hardware structure or when the chopper is erroneously fired due to a noise or the like, whereby a load current of a magnitude exceeding the commutation capability of the chopper is caused to flow. Thus, according to the method of detecting the commutation failure after generation of the turn-off signal as mentioned above, it is impossible or requires unreasonably great delay to detect the commutation failure brought about by the false firing or malfiring in the state in which a voltage is applied across the chopper while no gate signal is applied or the commutation failures ascribable to various other false or erroneous operations.

SUMMARY OF THE INVENTION

An object of the present invention is, therefore, to provide a chopper control apparatus in which shortcomings described above are eliminated.

Another object of the invention is to provide a chopper control apparatus which is capable of detecting the commutation failures inclusive of those ascribable to the false firing and other causes with an enhanced reliability in a simplified hardware configuration.

According to an aspect of the invention, there is provided a chopper control apparatus which comprises chopper means connected between a d.c. power supply source and a load, a computer for performing arithmetic operations for controlling a duty factor of the chopper means, means for supplying a clock signal of a predetermined period to the computer, means for supplying a turn-on signal to the chopper means in synchronism with the clock signal, means for supplying a turn-off signal to the chopper means after a delay of period of time based on the results of the arithmetic operation performed by the computer in succession to the supply of the turn-on signal, means for detecting the conducting state of the chopper means, and delay means for delaying output signal produced by the conducting state detecting means, the computer being provided with a commutation failure detecting program for detecting presence or absence of the output signal produced by the delay means in response to the clock signal also serving as an interrupt signal.

In a preferred embodiment of the invention, the computer responds to the interrupt request signal periodically produced in synchronism with the operation period of the chopper to execute arithmetic operations in accordance with a previously programmed interrupt routine for determining a desired conduction angle or phase shift quantity utilized in the gate control of the chopper. The phase shift quantity thus obtained in the form of a digital signal is transferred to a programmable timer which then converts the input signal into an analog phase shift output pulse signal having a pulse width corresponding to the desired conduction angle. The turn-off signal is produced in response to the leading edge of the analog phase shift output pulse, while the turn-off signal is produced in response to the trailing edge of the output pulse. Although the conducting or non-conducting state of the chopper is continuously detected, the result of the detection is fetched by the computer with a predetermined time delay so that it is utilized in the execution of the interrupt routine triggered in response to the interrupt request signal. In this way, the commutation failure is determined when the chopper is conducting immediately before the generation of the interrupt request signal, and is made use of for generating commands to take protection measures such as the breaking of the main current path and others.

BRIEF DESCRIPTION OF THE DRAWINGS

FIGS. 2A to 2D are signal waveform diagrams to illustrate waveforms of signals produced at various circuit points in the apparatus shown in FIG. 1 in different operating states thereof, respectively;

FIG. 4 shows a flow chart to illustrate detection of commutation failure and sequence of arithmetic operations for determining a desired conduction angle.

DETAILED DESCRIPTION OF THE PREFERRED EMBODIMENTS

Figure 1:
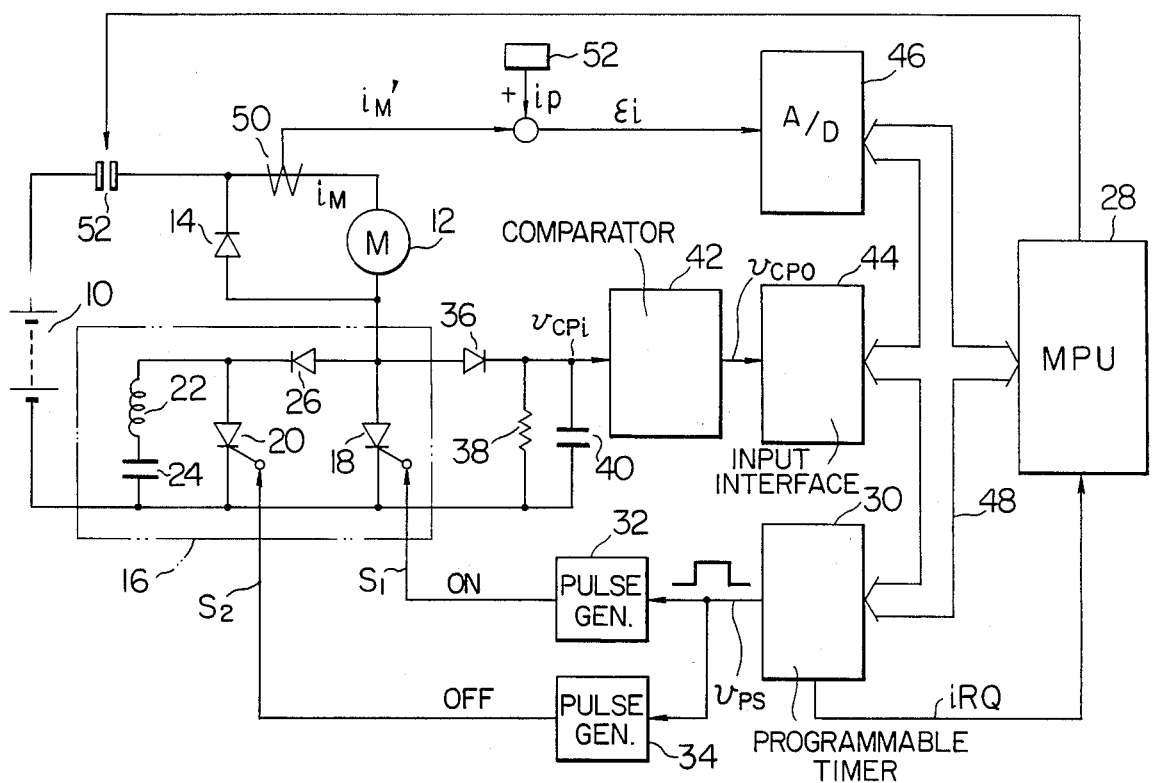
FIG. 1 is a block circuit diagram showing an arrangement of a chopper control apparatus according to an examplary embodiment of the invention.

Referring to FIG. 1 which shows a preferred embodiment of the invention, a chopper circuit 16 and a parallel connection of a drive motor 12 and a freewheeling diode 14 are connected in series to a d.c. power supply source or battery 10. The chopper circuit 16 is shown as a typical one of parallel extinction type and is composed of a main thyristor 18 for conducting a motor current, a commutating thyristor 20 for conducting a commutated current, a commutating reactor 22, a commutating capacitor 24 and a diode 26 for preventing the capacitor 24 from being discharged. The duty factor of the chopper circuit 16 is controlled through cooperation of a micro-processor (hereinafter referred to as MPU) 28, a programmable timer (hereinafter referred to as PTM) 30 and differentiated pulse generators 32 and 34. A terminal voltage appearing across the chopper 16 is detected with the aid of a diode 36 and a parallel RC-circuit of a resistor 38 and a capacitor 40 and supplied to the MPU 28 as fetched through a voltage comparator 42 and an input interface circuit (hereinafter referred to as IIF) 44. Interconnection among an analog-to-digital converter (hereinafter referred to as A/D) 46, the IIF 44, the PTM 30 and the MPU 28 is realized by a bus 48.

FIGS. 2A to 2D show signal waveforms of various electric signals produced at different circuit points in operation of the apparatus shown in FIG. 1. By referring to FIGS. 2A to 2D, the operation of the circuit shown in FIG. 1 will be described below.

In the first place, a period $T_{CH}$ for the operation of the chopper 16 is set at the PTM 30 which supplies a clock signal to the MPU 28 as an interrupt request signal iRQ for every period $T_{CH}$. In response to the interrupt request iRQ, the operation of the MPU 28 is changed over from the processing of a main routine MR to an iRQR and a commutation failure detecting process is carried out processing routine iRQ, as is illustrated in a sequential program execution diagram of FIG. 3. The A/D converter 46 is activated after the detecting process CFD is carried out. The A/D converter 46 then converts a deviation or difference $\epsilon_1$ between a command value $i_P$ inputted, for example, by actuating an acceleration pedal 52 by a driver and a value $i_M'$ produced by a current detector (CT) 50 for detecting a motor current $i_M$ into a corresponding digital value which is supplied to the MPU 28. On the basis of the inputted digital deviation $\epsilon_1$, the MPU performs calculation of compensation of a control factor constituted by amplification and delay elements, such as, for example, a first order lag, to thereby determine in a digital value a phase shifting quantity to be outputted for controlling the conduction period of the chopper circuit 16. The digital phase shift signal is transferred from the MPU 28 to the PTM 30 in synchronism with the next interrupt request signal iRQ. The PTM 30 converts the digital phase shift signal into a corresponding analog phase shift signal which is outputted in the form of a rectangular pulse signal $v_{PS}$. The pulse signal $v_{PS}$ has a pulse width or duration corresponding to a desired duty factor. The differentiator 32 produces a steep pulse signal in response to the rising or leading edge of the pulse $v_{PS}$, the steep pulse signal being supplied to the main thyristor 18 as a turn-on signal $S_1$. On the other hand, the differentiator 34 produces a steep pulse signal in response to the falling or trailing edge of the pulse $v_{PS}$. The steep pulse signal of the differentiator 34 is supplied to the commutating thyristor 20 as a turn-off signal $S_2$. Thus, when the output signal $v_{PS}$ is present, the turn-on signal $S_1$ is applied to the main thyristor 18 in synchronism with the interrupt request signal iRQ for every operation period $T_{CH}$ of the shopper circuit 16. In this manner, current control is attained, such that the motor current $i_M$ is caused to follow the command value $i_P$.

In FIG. 2A, waveforms of various signals are depicted on the assumption that the chopper 16 is in the state to effect the normal commutating operation. Referring to this figure, when the turn-on signal $S_1$ is applied to the main thyristor 18 at a time point $t_1$, the thyristor voltage $v_{Th1}$ across the main thyristor 18 is zeroed. However, since the input voltage $v_{CPi}$ applied to the voltage comparator 42 is decreased with a time constant determined by the resistance of the resistor 38 and the capacitance of the capacitor 40 even when the thyristor voltage $v_{Th1}$ becomes zero, there is involved a time delay before the operation voltage $v_S$ of the comparator 42 has been attained, so that the output voltage $v_{CPO}$ of the comparator 42 becomes zero at a time point $t_2$ delayed by a time $\Delta t$ from the time point $t_1$.

Figure 3:
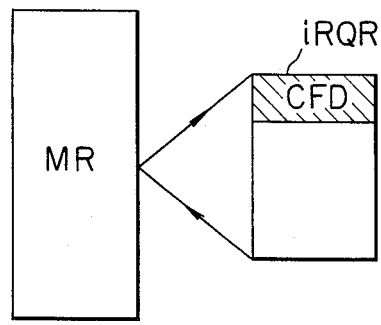
FIG. 3 illustrates in a schematic diagram a sequence of execution of programs employed in the apparatus shown in FIG. 1.

At time points $t_1$ and $t_3$ at which the interrupt request signal iRQ is issued to the MPU 28, i.e. at the start of the iRQ routine shown in FIG. 3 (actually, after the results of the preceding arithmetic operation for determining the duty factor has been transferred to the PTM 30), the processing for detecting the commutation failure mentioned hereinbefore is effected in a manner as illustrated in a flow chart in FIG. 4.

Referring to FIG. 4, at a start step 100 for initiating the interrupt processing, the IIF 44 is activated to thereby allow the output voltage signal $v_{CPO}$ of the voltage comparator 42 to be fetched by the MPU 28. At the next step 102, it is decided whether the fetched voltage signal $v_{CPO}$ is logic "1" or "0". In the case where the chopper 16 is in the normal state as illustrated in FIG. 2A, the result of decision at the step 102 is logic "1". Then, the processing proceeds to the step 104 where the conduction angle, i.e. the digital phase shift quantity to be outputted is arithmetically determined. The delay time $\Delta t$ mentioned above may be so selected that the output voltage signal $v_{CPO}$ of the voltage comparator 42 can be fetched and processed within the delay time $\Delta t$. However, when various initializations are to be carried out at the start of the iRQ routine, the delay time $\Delta t$ has to be selected sufficiently large in consideration of the time additionally required for these initializations. At a step 106, the deviation $\epsilon_i = i_M' - i_P$ is fetched from the A/D 46, whereupon compensation $k/(1+T_s)$ of first order lag for the control system corresponding to the deviation $\epsilon_i$ is arithmetically determined at a step 108. At a step 110, the conduction angle resulted from the arithmetic operation is transferred to the PTM 30. With this transfer, a single cycle of the interrupt processing has been completed and the processing of the main routine is regained.

FIG. 2B shows waveforms of the various signals produced in the case where the commutation failure occurs notwithstanding application of the turn-off signal $S_2$ to the commutating thyristor 20 at a time point $t_4$ due to the fact that the motor current exceeds the commutating capability of the thyristor 20. In this assumed case, no voltage is produced across the main thyristor 18 from the time point $t_4$ and thus the output voltage signal $v_{CPO}$ of the voltage comparator 42 is zero. Under the circumstances, when the processing routine described hereinbefore in conjunction with FIG. 4 is executed in response to the interrupt request signal iRQ produced at a time point $t_5$, the decision made at the step 102 will result in that the output voltage signal $v_{CPO}$ is logic "0", indicating the commutation failure. As the consequence, the processing proceeds to a step 112 where a main circuit breaking command signal is issued for actuating a line breaker 52 shown in FIG. 1.

Next, description will be made by referring to FIG. 2C. It should first be mentioned that when a fork lift truck is to be temporarily stopped, the main current path is usually not broken but a foward/retreat (FR) lever is set to the neutral position to render the accelerating operation ineffective, differing from other electric cars. When the FR lever is set at neutral position, the motor current $i_M$ and hence the detected motor current $i_M'$ are zero, and the deviation signal $\epsilon_1$ is also zero. As the consequence, the digital phase shift signal transferred to the PTM 30 from the MPU 28 in response to every interrupt request signal iRQ is zero. Thus, neither the turn-on signal $S_1$ nor the turn-off signal $S_2$ is applied to the chopper 16. Under these conditions, a terminal voltage appears continuously across the main thyristor 18, and thus the decision made at the step 102 in the execution of the processing illustrated in FIG. 4 will result in that the output voltage signal $v_{CPO}$ is logic "1". When a false firing signal is applied to the main thyristor 18 at a time point $t_7$ in the state mentioned just above, the main thyristor 18 is erroneously turned on, bringing about the same phenomenon or effect as the commutation failure. In this case, the result of decision made at the step 102 for the output voltage signal $v_{CPO}$ of the comparator 42 which was logic "1" at the time point $t_6$ will turn out to be logic "0" at a time point $t_8$, indicating the commutation failure.

FIG. 2D shows the signal waveforms depicted on the assumption that a false firing signal applied to the main thyristor 18 during a time span between a time point $t_9$ at which the turn-off signal $S_2$ is applied to the commutating thyristor 20 and a time point $t_{11}$ at which the turn-on signal $S_1$ is applied to the thyristor 20. It will be seen that the commutation failure as brought about can be detected without delay by the interrupt processing effected at a time point $t_{11}$.

As will be appreciated from the foregoing description of the exemplary embodiment of the invention, the commutation failures occurring under the various conditions can be reliably detected with a simplified hardware configuration without requiring any especial and additional interrupt.

Further, the commutation failure can be detected with a delay time which falls within the operation period of the chopper, to an advantage.

In the foregoing, it has been mentioned that the processing for fetching the output voltage signal $v_{CPO}$ of the voltage comparator 42 and the processing for the logical decision as to whether the fetched signal $v_{CPO}$ is logic "1" or "0" are successively excecuted. It goes however without saying that the processing for the logical decision may be executed later on separately from the fetching processing by temporarily storing the result of the fetching processing in an appropriate register.

Further, in the case of the illustrated embodiment, the terminal voltage $v_{Th1}$ of the main thyristor 18, i.e. the terminal voltage of the chopper 16 is detected. However, the invention is not restricted to any special type of detecting means, so far as the non-conduction of the chopper 16 can be detected. For example, the current flowing through the chopper circuit is detected and the inverted detection signal may be made use of with the similar effect.

With a veiw to sparing any especially prepared interrupt for the detection of the failure commutation, it has been described that the programs for reading out the result of arithmetic operation for determining the control quantity for the duty factor, detection of the commutation failure and the arithmetic determination of the control quantity for the duty factor are activated by the interrupt signal (clock signal) in synchronism with the turn-on signal of the chopper. However, the circuit configuration may be made such that the various controls mentioned in the preamble can be executed with only the single interrupt, to thereby simplify significantly the hardware configuration as a whole.

We claim:

1. A chopper control apparatus comprising:
   chopper means connected between a d.c. power supply source and a load;
   a computer for performing an arithmetic operation for controlling a duty factor of said chopper means;
   means for supplying a clock signal of a predetermined period to said computer;
   means for supplying a turn-on signal to said chopper means in synchronism with said clock signal;
   means for supplying a turn-off signal to said chopper means after a delay of period of time based on the results of the arithmetic operation performed by said computer subsequent to the supply of said turn-on signal;
   means for detecting a conducting state of said chopper means;
   delay means for delaying an output signal produced by said conducting state detecting means; and
   said computer being provided with a commutation failure detecting program for detecting presence or absence of said output signal produced by said delay means in response to said clock signal serving as an interrupt signal.

2. A chopper control apparatus according to claim 1, wherein said computer is provided with a program for executing the arithmetic operation for controlling the duty factor of said chopper means for the subsequent period in response to the interrupt brought about by said clock signal.

3. A chopper control apparatus according to claim 2, wherein said clock signal means includes programmable timer means which produces a phase shift pulse signal having a pulse width corresponding to the duty factor determined on the basis of the results of the arithmetic operation performed by said computer for controlling the duty factor, said turn-on signal supplying means including first differentiating means for producing a pulse signal serving as said turn-on signal in response to the leading edge of said phase shift pulse signal, and said turn-off signal supplying means including second differentiating means for producing a pulse signal serving as said turn-off signal in response to the trailing edge of said phase shift pulse signal.

4. A chopper control apparatus according to claim 3, wherein said commutation failure detecting program is so prepared as to regard the absence of the output from said delay means as occurrence of the commutation failure and executed every time said clock signal is supplied to said computer, while the program for controlling said duty factor is executed subsequent to said commutation failure detecting program when no occurrence of the commutation failure is determined through excecution of said commutation failure detecting program.

* * * * *